United States Patent
Ayyagari et al.

(10) Patent No.: US 9,533,762 B2
(45) Date of Patent: Jan. 3, 2017

(54) ENERGY-HARVESTING-BASED CONTROL AND COMMUNICATION FOR A CABIN SERVICES SYSTEM

(71) Applicant: THE BOEING COMPANY, Huntington Beach, CA (US)

(72) Inventors: Arun Ayyagari, Seattle, WA (US); Sudhakar S. Shetty, Seattle, WA (US); Scott Edward Marston, Bellevue, WA (US); Venkata Prabhakar, Karnataka (IN)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/721,787

(22) Filed: May 26, 2015

(65) Prior Publication Data

US 2016/0347453 A1    Dec. 1, 2016

(51) Int. Cl.

| | |
|---|---|
| *G06F 7/00* | (2006.01) |
| *H04W 4/00* | (2009.01) |
| *B64D 11/00* | (2006.01) |
| *H04L 29/08* | (2006.01) |
| *B64D 45/00* | (2006.01) |

(52) U.S. Cl.
CPC ........... *B64D 11/0015* (2013.01); *B64D 45/00* (2013.01); *H04L 67/12* (2013.01); *B64D 2011/0053* (2013.01)

(58) Field of Classification Search
USPC ............................................ 701/36; 455/431
See application file for complete search history.

(56) References Cited

U.S. PATENT DOCUMENTS 6,754,602 B1 * 6/2004 Tkachenko ............... H02J 9/02
702/108
8,359,026 B2 * 1/2013 de la Chapelle .. H04B 7/18506
455/422.1

(Continued)

FOREIGN PATENT DOCUMENTS

EP      2 770 488 A1    8/2014

OTHER PUBLICATIONS

Extended European Search Report dated Sep. 26, 2016 in corresponding European Application No. 16167675.4.

*Primary Examiner* — Thomas G Black
*Assistant Examiner* — Tyler Paige
(74) *Attorney, Agent, or Firm* — Womble Carlyle Sandridge & Rice LLP (57) ABSTRACT

A passenger control unit is provided that may include a push-button, power assembly, and control and communication circuitry. The push-button may be for control of a passenger service unit (PSU) onboard a passenger vehicle, and may also generate mechanical energy when pushed. The power assembly may convert the mechanical energy to electrical energy, and store the electrical energy, solely from which the control and communication circuitry may be powered. The control and communication circuitry may include a microprocessor and a communications interface. The microprocessor may receive an indication when the push-button is pushed, and generate an instruction to control the PSU in response thereto. And the communications interface wirelessly transmit the instruction to a control unit configured to effect control of the PSU based thereon.

18 Claims, 6 Drawing Sheets

(56) References Cited

U.S. PATENT DOCUMENTS

| | | | | |
|---|---|---|---|---|
| 8,376,457 B2* | 2/2013 | Muirhead | ............ | B64D 11/0015 |
| | | | | 244/118.6 |
| 8,930,088 B2* | 1/2015 | Bauer | ................... | B64D 11/00 |
| | | | | 701/13 |
| 2004/0098745 A1* | 5/2004 | Marston | ................ | H04N 7/106 |
| | | | | 725/73 |
| 2006/0246892 A1* | 11/2006 | vonDoenhoff | ........ | H04W 28/16 |
| | | | | 455/427 |
| 2007/0057121 A1 | 3/2007 | Callahan et al. | | |
| 2007/0057122 A1* | 3/2007 | Lee | ................... | H04N 21/2146 |
| | | | | 244/118.5 |
| 2007/0057576 A1* | 3/2007 | Lee | .......................... | H02J 1/08 |
| | | | | 307/9.1 |
| 2007/0061847 A1* | 3/2007 | Callahan | ............ | B64D 11/0015 |
| | | | | 725/76 |
| 2010/0285747 A1 | 11/2010 | Bauer et al. | | |
| 2011/0195656 A1* | 8/2011 | Owyang | ............... | H04W 64/00 |
| | | | | 455/3.01 |
| 2012/0191297 A1 | 7/2012 | Callahan et al. | | |
| 2014/0036686 A1* | 2/2014 | Bommer | ............... | H04W 24/06 |
| | | | | 370/241 |

\* cited by examiner

ENERGY-HARVESTING-BASED CONTROL AND COMMUNICATION FOR A CABIN SERVICES SYSTEM

TECHNOLOGICAL FIELD

The present disclosure relates generally to the provision of passenger services and, in particular, to control of passenger service units of a cabin-services system onboard a passenger vehicle such as an aircraft.

BACKGROUND

As systems, such as the multimedia entertainment, communications and diagnostic systems utilized in the transportation industry become more complex, a need arises for additional devices to communicate with one another. Historically, these systems included dedicated wiring extending between the various devices in order to support their communication. As systems have become more integrated and communication requirements have increased, the required amount of dedicated wiring has quickly become excessively large, both in terms of the space required for the wiring and the cost of the wiring and the attendant installation.

The cabin-services system within an aircraft cabin includes passenger service units (PSUs) that provide a number of functions to passengers, such as reading lights and attendant call lights (for requesting an attendant). These PSUs are controlled by respective passenger control units (PCUs), and these PCUs are currently integrated with passenger in-flight entertainment (IFE) systems that provide the wiring to passenger seats for both the power and communication required by the PCUs.

The increasing proliferation of mobile computing devices such as smartphones and tablet computers that provide effective display capabilities has prompted a thought that passengers in the future will bring their own devices for IFE viewing. Given this trend, a segment of airlines have proposed to either not provide any IFE system, or only provide wireless dissemination of IFE content and defer to the passengers to use their own mobile computing devices for viewing. This proposal has a compelling value proposition to aircraft manufacturers and airlines in that it may simplify seat installations/configurations by eliminating the need to provide electrical wiring to IFE systems for power and communication, and in that it may provide airlines with greater flexibility in managing IFE content and how it is delivered to passengers. But the elimination of this electrical wiring also gives rise to a challenge in powering PCUs and enabling them to communicate.

Therefore, it may be desirable to have an apparatus and method that takes into account at least some of the issues discussed above, as well as possibly other issues.

BRIEF SUMMARY

Example implementations of the present disclosure are generally directed to an improved passenger control unit (PCU) and method of controlling a passenger service unit (PSU) therefrom, without relying on power or communication through an IFE system. In accordance with example implementations, the PCU may include a power assembly configured to harvest energy sufficient to power control and communication circuitry of the PCU, which may wirelessly communicate instructions to control the PSU. The PCU may also incorporate security mechanisms such as encryption designed to avoid the instructions from any PCU effecting control of an unintended PSU, and error detection designed to provide assurance of the integrity of the instructions. These security mechanisms may also protect against one inadvertently or maliciously reconfiguring or reprogramming the PCU.

The present disclosure thus includes, without limitation, the following example implementations. In some example implementations, the PCU includes a push-button, power assembly, and control and communication circuitry. The push-button may be for control of a PSU onboard a passenger vehicle, and also configured to generate mechanical energy when pushed. The power assembly may be coupled to the push-button, and configured to convert the mechanical energy to electrical energy, and store the electrical energy.

The control and communication circuitry may be coupled to the power assembly and powered solely from the electrical energy stored thereby. The control and communication circuitry may include a microprocessor coupled to the push-button, and a communications interface coupled to the microprocessor. The microprocessor may be configured to receive an indication when the push-button is pushed, and generate an instruction to control the PSU in response thereto. And the communications interface may be configured to wirelessly transmit the instruction to a control unit configured to effect control of the PSU based thereon.

In some example implementations of the PCU of the preceding or any subsequent example implementation, or any combination thereof, the power assembly may include an electric generator configured to convert the mechanical energy to electrical energy, and an accumulator coupled to the generator and configured to store the electrical energy.

In some example implementations of the PCU of the preceding or any subsequent example implementation, or any combination thereof, the communications interface being configured to wirelessly transmit the instruction includes being configured to wirelessly transmit the instruction to the control unit independent of any in-flight entertainment (IFE) system onboard the passenger vehicle.

In some example implementations of the PCU of any preceding or subsequent example implementation, or any combination thereof, the microprocessor being configured to generate the instruction includes being configured to calculate an error-detecting code, and the PSU includes a reading light and an attendant call light. In these example implementations, the PCU further comprises a push-button assembly including the push-button for control of one of the reading light or attendant call light, and another push-button for control of the other of the reading light or attendant call light. And the microprocessor being configured to generate the instruction includes being configured to generate the instruction including an indication of the reading light or attendant call light for which the push-button is pressed.

In some example implementations of the PCU of any preceding or subsequent example implementation, or any combination thereof, the microprocessor being configured to generate the instruction includes being configured to generate the instruction including an indication of a location of a passenger seat assigned to the PCU, or a unique identifier of the passenger control unit from which the location of the passenger seat is obtainable. In these example implementations, the control unit includes a head-end. And communications interface being configured to wirelessly transmit the instruction includes being configured to wirelessly transmit the instruction to the head-end configured to locate the PSU from a plurality of PSUs based on the location of the passenger seat.

In some example implementations of the PCU of any preceding or subsequent example implementation, or any combination thereof, the communications interface being configured to wirelessly transmit the instruction includes being configured to wirelessly transmit the instruction to the control unit dedicated to the PSU. In these example implementations, the control unit is one of a plurality of control units dedicated to a respective plurality of PSUs.

In some example implementations of the PCU of any preceding or subsequent example implementation, or any combination thereof, the PCU is configured to inductively couple to an electrical device for transfer of electrical energy therefrom. And the power assembly being configured to store the electrical energy includes being configured to store the electrical energy transferred from the electrical device.

In some example implementations of the PCU of any preceding or subsequent example implementation, or any combination thereof, the communications interface includes a near-field-communication (NFC) interface configured to inductively couple to the electrical device, and receive an assignment of a passenger seat to the PCU, with the assignment being received from the electrical device during an initial configuration of the PCU. And the microprocessor being configured to generate the instruction includes being configured to generate the instruction including an indication of a location of the passenger seat assigned to the PCU.

In some example implementations of the PCU of any preceding or subsequent example implementation, or any combination thereof, the NFC interface is further configured to receive a cryptographic key from the electrical device during the initial configuration of the PCU. In these example implementations, the microprocessor being configured to generate the instruction includes being configured to generate a keyed-hash message authentication code (HMAC) using the cryptographic key, and include the HMAC in the instruction.

Other example implementations provide a method of controlling a PSU onboard a passenger vehicle from a PCU including a push-button switch, and control and communication circuitry. The method includes generating mechanical energy when the push-button is pushed; and converting the mechanical energy to electrical energy, and storing the electrical energy. The control and communication circuitry may be powered solely from the stored electrical energy. The method includes by the control and communication circuitry, receiving an indication when the push-button is pushed, and generating an instruction to control the PSU in response thereto. And by the control and communication circuitry, the method includes wirelessly transmitting the instruction to a control unit configured to effect control of the PSU based thereon.

In some example implementations of the method of the preceding or subsequent example implementation, or any combination thereof, wirelessly transmitting the instruction includes wirelessly transmitting the instruction to the control unit independent of any IFE system onboard the passenger vehicle.

In some example implementations of the method of any preceding or subsequent example implementation, or any combination thereof, generating the instruction includes generating a HMAC, and including the HMAC in the instruction.

In some example implementations of the method of any preceding or subsequent example implementation, or any combination thereof, the PSU includes a reading light and an attendant call light, and the PCU further has a push-button assembly including the push-button for control of one of the reading light or attendant call light, and another push-button for control of the other of the reading light or attendant call light. In these example implementations, generating the instruction includes generating the instruction including an indication of the reading light or attendant call light for which the push-button is pressed.

In some example implementations of the method of any preceding or subsequent example implementation, or any combination thereof, generating the instruction includes generating the instruction including an indication of a location of a passenger seat assigned to the PCU. In these example implementations, the control unit includes a head-end, and wirelessly transmitting the instruction includes wirelessly transmitting the instruction to the head-end configured to locate the PSU from a plurality of PSUs based on the location of the passenger seat.

In some example implementations of the method of any preceding or subsequent example implementation, or any combination thereof, wirelessly transmitting the instruction includes wirelessly transmitting the instruction to the control unit dedicated to the PSU, with the control unit being one of a plurality of control units dedicated to a respective plurality of PSUs.

In some example implementations of the method of any preceding or subsequent example implementation, or any combination thereof, the method further comprises inductively coupling the PCU to an electrical device for transfer of electrical energy therefrom, and storing the electrical energy includes storing the electrical energy transferred from the electrical device.

In some example implementations of the method of any preceding or subsequent example implementation, or any combination thereof, the PCU further has a NFC interface for inductively coupling the PCU to the electrical device. In these example implementations, the method further comprises by the NFC interface, receiving an assignment of a passenger seat to the PCU, with the assignment being received from the electrical device during an initial configuration of the PCU. And generating the instruction includes generating the instruction including an indication of a location of the passenger seat assigned to the PCU.

In some example implementations of the method of any preceding or subsequent example implementation, or any combination thereof, the method further comprises by the NFC, receiving a cryptographic key from the electrical device during the initial configuration of the PCU. In these example implementations, generating the instruction includes generating a HMAC using the cryptographic key, and including the HMAC in the instruction.

Yet other example implementations provide a passenger vehicle comprising a main body, a plurality of PSUs and PCUs, and at least one control unit. The main body defines a cabin through which (a plurality of) passenger seats are situated. The PSUs are associated with the respective plurality of passenger seats, and each of the PCUs includes a push-button for control of a respective PSU of the plurality of PSUs. In these example implementations, each PCU is configured to at least harvest and store electrical energy solely from which the PCU is powered, and receive an indication when the push-button is pushed, and generate and wirelessly transmit an instruction to control the respective PSU in response thereto. The control unit(s) is/are coupled to the PSUs, a control unit of the control unit(s) is configured to receive the instruction from the PCU and effect control of the respective PSU based thereon.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the present disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Example implementations of the present disclosure are generally directed to the provision of passenger services onboard a passenger vehicle including a main body that defines a cabin in which passengers travel. Example implementations will be primarily described in the context of an aircraft including a fuselage that defines an appropriate cabin. It should be understood, however, that example implementations may be equally applicable to any of a number of other types of passenger vehicles such as motor vehicles (e.g., buses), railed vehicles (e.g., trains, trams), watercraft (e.g., ships, boats), spacecraft and the like.

Figure 1:
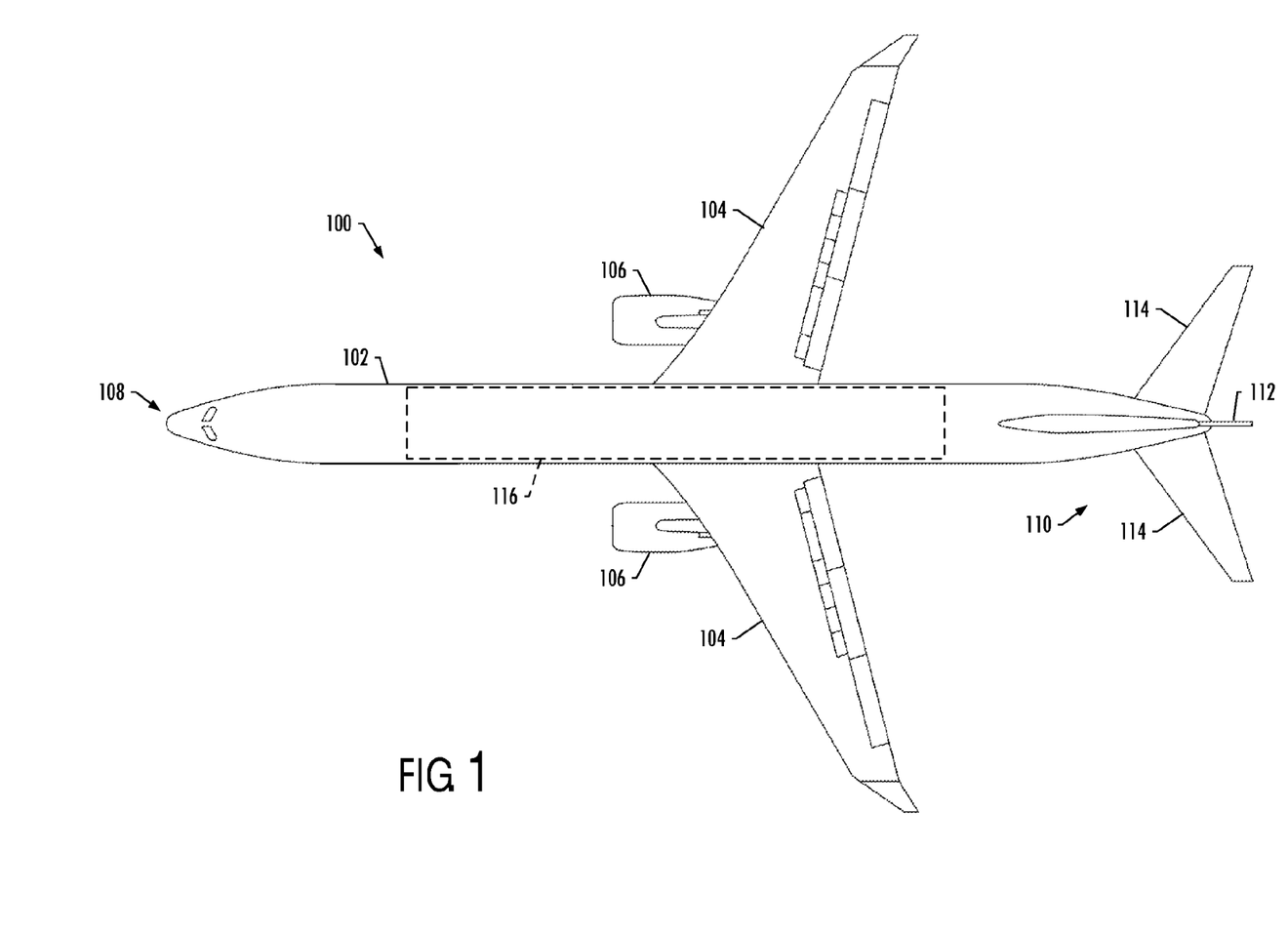
FIG. 1 illustrates an aircraft according to various example implementations of the present disclosure.

FIG. 1 illustrates an aircraft 100 according to various example implementations of the present disclosure. The aircraft includes an airframe with a fuselage (main body) 102 to which a pair of wings 104 are attached. The aircraft may also include propulsion system with a pair of engines 106 attached to the wings. The fuselage has a nose section 108 at the forward part of the aircraft, and a tail section 110 at the aft part of the aircraft. A vertical stabilizer 112 and a pair of horizontal stabilizers 114 are attached to the tail section of the fuselage. As shown, the aircraft is a commercial, twin-engine aircraft. It should be understood, however, that other types of aircraft including fixed-wing aircraft and rotorcraft, commercial and military aircraft, and the like may be equally equipped with the system of example implementations.

Figure 2:
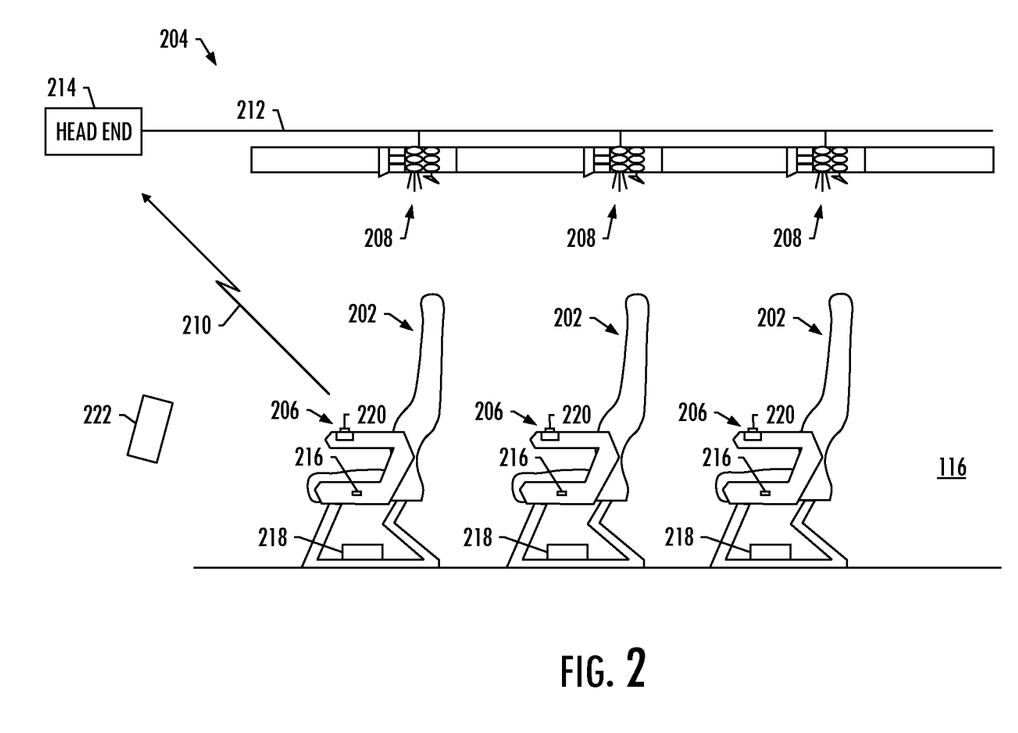
FIGS. 2 and 3 illustrate a portion of a cabin of the aircraft of FIG. 1, in accordance with some example implementations.
Figure 3:
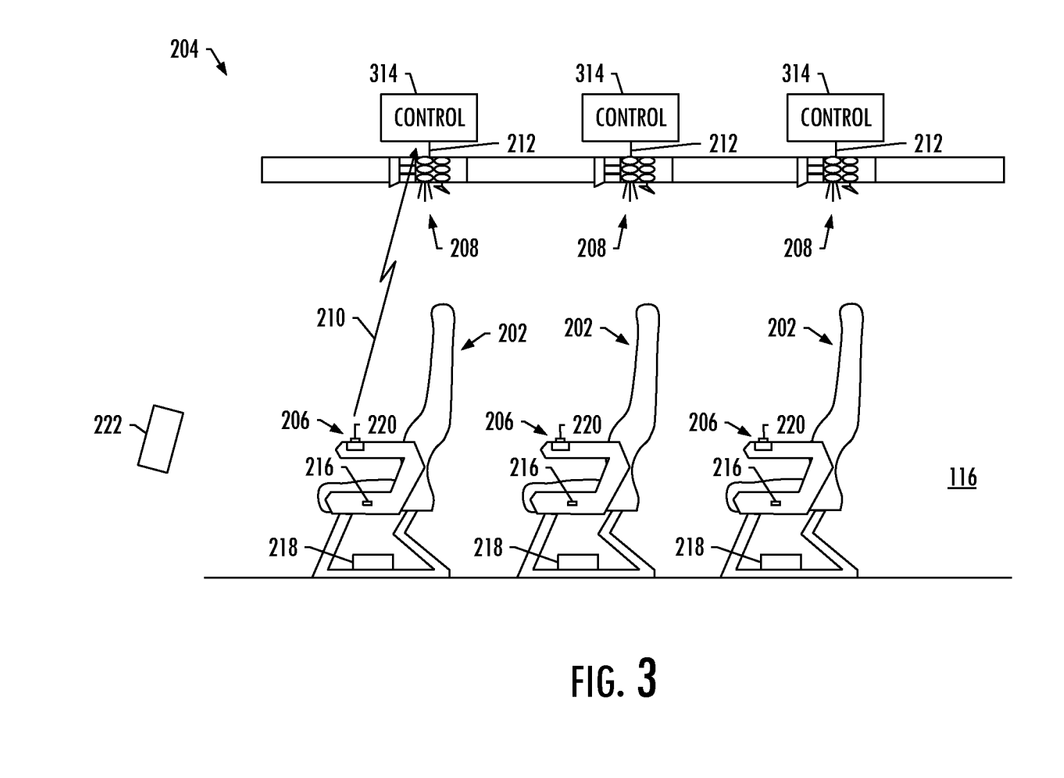

As also shown in FIG. 1 the fuselage 102 of the aircraft defines a cabin 116 in which passengers travel. FIGS. 2 and 3 illustrate a portion of the cabin according to some example implementations of the present disclosure. As shown, the aircraft 100 includes a plurality of passenger seats 202 situated through the cabin. The aircraft also includes a cabin-services system 204 that may include a plurality of passenger control units (PCUs) 206 and passenger service units (PSUs) 208. In one example, the PCUs may be installed anywhere on respective passenger seats (e.g., seat arm, seat back), and the PSUs may be installed above respective passenger seats or rows of seats). In one example, the PSUs may include respective sets of passenger-service components such as sets of reading lights, personal-air outlets, attendant call lights and emergency oxygen (under control of appropriate circuitry).

The cabin-services system 204 may include a control unit coupled to the PCUs 206 by a wireless connection 210, and coupled to the PSUs 208 by a wireless connection or a wired connection 212. In some examples, as shown in FIG. 2, the control unit may be in the form of a head-end 214 coupled to the PCUs and PSUs. In other examples, as shown in FIG. 3, the control unit may be in the form of a plurality of control units 314 dedicated to respective PSUs. In these other examples, the control units may be wirelessly coupled to respective PCUs, and coupled to (wirelessly or by wire) the respective PCUs to which the control units are dedicated.

In some examples, the cabin-services system 204 may further include automatic identification and data capture (AIDC) components 216, such as a barcode radio frequency identification (RFID) tag or the like, with which the passenger seats 202 may be equipped. Each AIDC component tag may store various pieces of information such as the location of the passenger seat with which the AIDC component is equipped, and perhaps also a unique identifier of a PSU 208 (or identifiers of one or more passenger-service components—e.g., reading light, attendant call light—of the PSU) above the passenger seat. The passenger seat location may be expressed in any of a number of different manners to uniquely identify the passenger seat relative to others of the passenger seats, such as by row and position within the row (e.g., window, middle, aisle), and according to which the passenger seat may be associated with one or more passenger-service components of the PSU above it.

The cabin-services system 204 may also include in-flight entertainment (IFE) systems 218 (seat electronics boxes), which in one example, may be installed below respective passenger seats 202 or rows of seats; although in some examples, these IFE systems in particular may be omitted.

In accordance with example implementations of the present disclosure, each PCU 206 may be configured to harvest and store electrical energy solely from which the PCU is powered. The PCU may include one or more push-buttons 220 for control of a respective PSU 208. In this regard, the PCU may be configured to receive an indication when the push-button is pushed, and generate and wirelessly transmit (over wireless connection 210) an instruction to control the respective PSU in response thereto. The PCU may be powered and configured to communicate independent of any IFE system 218 onboard the aircraft 100. That is, the PCU may be powered and configured to communicate without depending on any IFE system onboard the aircraft. The control unit 214, 314 may be configured to receive the instruction from the PCU and effect control of the respective PSU based thereon.

Figure 4:
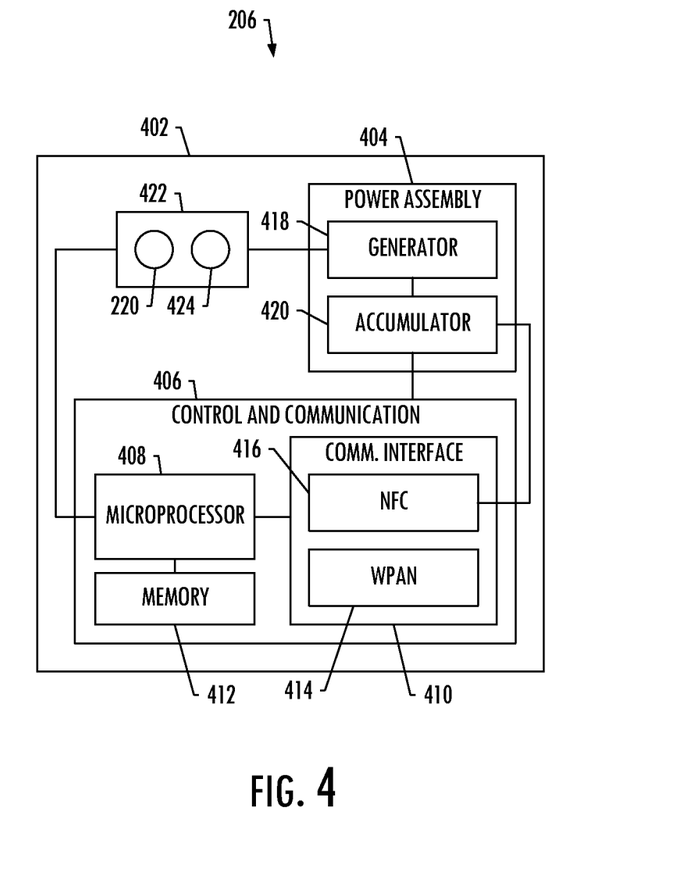
FIG. 4 illustrates a passenger control unit (PCU) according to some example implementations.

FIG. 4 illustrates a PCU 206 according to some example implementations of the present disclosure. As shown, the PCU may include a housing 402 enclosing various components of the PCU, and to which the push-button 220 may be affixed. These components may include, for example, a power assembly 404, and control and communication circuitry 406 including a microprocessor 408 and communications interface 410.

The microprocessor 408 is generally any piece of computer hardware that is capable of processing information such as, for example, data, computer programs and/or other suitable electronic information. The microprocessor is composed of a collection of electronic circuits some of which may be packaged as an integrated circuit or multiple interconnected integrated circuits (an integrated circuit at times more commonly referred to as a "chip"). The microprocessor may be configured to execute computer programs, which may be stored in suitable memory 412, which may also store other information used by the PCU 206. As explained below, this other information may include, for example, an indication of the location of the passenger seat 202 (e.g., row, seat position within the row) assigned to the PCU, a cryptographic key, and perhaps also a unique identifier of a PSU 208 (or identifiers of one or more passenger-service components—e.g., reading light, attendant call light—of the PSU) controllable by the PCU. In some examples, the microprocessor may include internal memory. In some examples, the microprocessor may be part of a microcontroller that also includes on-chip memory; or in some examples, the microprocessor may be configured to communicate with off-chip memory.

The communications interface 410 is generally any piece of computer hardware that is capable of wirelessly transmitting and/or receiving information (e.g., data), such as over wireless connection 210. The communications interface may include one or more interfaces for communication according to any of a number of different wireless technologies. As shown, for example, the communications interface may include a wireless personal area network (WPAN) interface 414 for communication according to any of a number of different WPAN technologies such as IEEE 802.15, Bluetooth®, low power versions of Bluetooth®, IrDA, UWB, Wibree, Zigbee® and the like. As also shown, the communications interface may include a near-field-communication (NFC) interface 416 for communication according to any of a number of NFC communication technologies. Although perhaps not as useful as lower-power technologies, other examples of suitable technologies for which the communications interface may include an interface include any of a number of 3GPP or 4GPP radio access technologies, UMTS UTRA, GSM radio access technologies, CDMA 2000 radio access technologies, wireless local area network technologies (e.g., IEEE 802.xx, e.g., 802.11a, 802.11b, 802.11g, 802.11n), WiMAX, IEEE 802.16, and the like.

As indicated above, the push-button 220 may be for control of a PSU 208. But the push-button may also be configured to generate mechanical energy when pushed. The power assembly 404 may be coupled to the push-button, and configured to convert the mechanical energy to electrical energy, and store the electrical energy. In some examples, the power assembly may include an electric generator 418 configured to convert the mechanical energy to electrical energy, and an accumulator 420 coupled to the generator and configured to store the electrical energy. Examples of suitable accumulators include rechargeable batteries, capacitors and the like.

The control and communication circuitry 406 may be coupled to the power assembly 404 and powered solely from the electrical energy stored thereby. The microprocessor 408 may be coupled to the push-button 220, and configured to receive an indication when the push-button is pushed. In response to the indication of when the push-button is pushed, the microprocessor may generate an instruction to control the PSU 208. In some examples, the microprocessor may calculate an error-detecting code such as a parity bit, checksum, cyclic redundancy check (CR) or the like to include with the message. Additionally or alternatively, the microprocessor may generate a keyed-hash message authentication code (HMAC), and include the HMAC in the instruction. In some examples, the microprocessor may encrypt the instruction, such as in accordance with any of a number of different symmetric key encryption schemes (e.g., Advanced Encryption Standard—AES). Encryption may not be needed in all instances given less sensitivity of the information in the instruction, but it may nonetheless be desirable to verify data integrity and authentication of the message, which the HMAC may enable. Use of the HMAC may also require less computational resources than encryption.

The communications interface 410 may be coupled to the microprocessor 408 and configured to wirelessly transmit the instruction to a control unit 214, 314 configured to effect control of the PSU 208 based thereon. This may be accomplished through any of a number of suitable interfaces, but in some examples, may be accomplished by the WPAN interface 414, which may communicate according to lower-power WPAN technologies. And as suggested above, in some examples, the communications interface may be configured to wirelessly transmit the instruction to the control unit independent of (i.e., without depending on) any IFE system 218.

As also suggested above, the PSU 208 may include various passenger-service components, such as a reading light and an attendant call light. In some examples, then, the PCU 206 may further include a push-button assembly 422, which may be affixed to the housing 402. This assembly may include the push-button 220 for control of one of the reading light or attendant call light, and another push-button 424 for control of the other of the reading light or attendant call light. The instruction generated by the microprocessor 408, then, may include an indication (e.g., identifying code) of the reading light or attendant call light for which the push-button is pressed.

In some examples such as more particularly those including the control unit embodied as a head-end 214, the instruction generated by the microprocessor 408 may include an indication of the location of the passenger seat 202 (e.g., row, seat position within the row) assigned to the PCU 206. In these examples, the communications interface 410 may be configured to wirelessly transmit the instruction (e.g., by WPAN interface 414) to the head-end configured to locate the PSU from a plurality of PSUs based on the location of the passenger seat. In other examples such as those in which the control unit is embodied as a dedicated control unit 314, the communications interface may be configured to wirelessly transmit the instruction to the dedicated control unit.

Briefly returning to FIGS. 2 and 3, in some examples, the PCU 206 may be configured to inductively couple to an electrical device 222 for transfer of electrical energy from the electrical device. In some examples, the electrical device may be embodied as a mobile computing device that may be carried from seat-to-seat within the cabin 114 during an initial configuration of PCUs, or during an updated configuration of PCUs. Examples of suitable mobile computing devices include laptops, ultra-mobile personal computers, portable computers, smartphones, tablet computers, wearable computers and the like. The power assembly 404 of the PCU may be configured to store (in the accumulator 420) the electrical energy transferred from the electrical device. But in addition to receiving electrical energy from the electrical device, the PCU may also receive information from the electrical device, such as during initial or updated configuration of the PCU. And the microcontroller 408 may store this information in memory 412 for later use.

Interaction of the PCU 206 with the electrical device 222 may be accomplished in any of a number of different manners. As shown, for example, the NFC interface 416 may be configured to inductively couple to the electrical device equipped with a compatible NFC interface; and from the electrical device, the NFC interface may receive an assignment of a passenger seat 202 to the PCU. These NFC interfaces may include appropriate NFC antennas through which the PCU and electrical device may be inductively coupled and also wirelessly communicate. The assignment of the passenger seat received by the NFC interface of the PCU may provide the indication location of the assigned passenger seat to the PCU, which the microprocessor 408 may store in memory 412, and include in the PCU's indication for control of the PSU 208. And in some further examples, the NFC interface may be further configured to receive a cryptographic key (e.g., symmetric key) from the electrical device during the initial or updated configuration of the PCU, which the microprocessor may store for use to generate an HMAC for the instruction and/or encrypt the instruction.

In some examples, the electrical device 222 may generate the indication of the location of the assigned passenger seat 202, such as by incrementing the passenger seats assigned to respective PCUs 206 during their initial configuration. In some examples, the electrical device may receive the indication of the location of the assigned passenger seat from an operator of the electrical device during the initial configuration. Or in some examples, the electrical device may be equipped with an appropriate reader of the AIDC component 216, and may receive the indication of the location of the assigned passenger seat from the AIDC component with which the assigned passenger seat is equipped.

In some examples, the PCU 206 may further include a physical reset button, which may be located within the housing 402 and therefore relatively inaccessible to the passenger. This reset button may enable an operator to reset and return the PCU to a default state in which the passenger seat location and cryptographic key may be cleared from memory 412, after which the PCU may be placed back in service through a new initial configuration.

Even further, in some examples, the PCU 206 may include one or more sensors such as one or more environmental-condition sensors. Examples of suitable environmental-condition sensors include audio sensors, temperature sensors, humidity sensors, light sensors and the like. These sensors may measure one or more environmental conditions, and provide corresponding measurement data to the microprocessor 408. In turn, the microprocessor may process, store (in memory 412) and/or transmit the measurement data to the control unit 214, 314 for processing, storage and/or further transmission.

Figure 5:
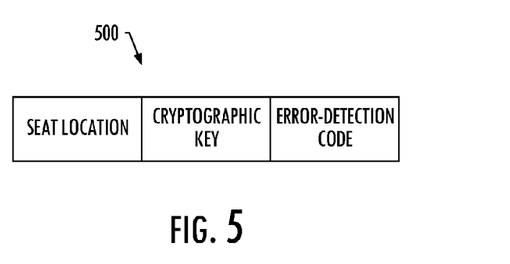
FIGS. 5-8 illustrate example message formats of instructions and other communications, according to various example implementations.
Figure 6:
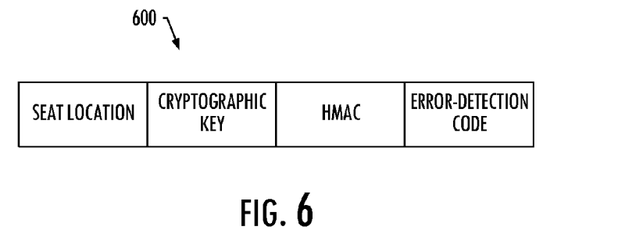

To further illustrate various features of example implementations of the present disclosure, FIGS. 5-8 illustrate example message formats of instructions and other communications that may be exchanged between the PCU 206, control unit 214, 314 and electrical device 222. As shown in FIGS. 5 and 6 for respectively initial and updated configuration of a PCU, the electrical device may power and provide information to the PCU for use in control of an appropriate PSU 208. During initial configuration, this information may be provided in a message 500 including an indication of the location of the passenger seat 202 to which the PCU is assigned and a cryptographic key (e.g., symmetric key). The electrical device may also calculate an error-detecting code (e.g., CRC) and include it in the message to the PCU to provide assurance of the integrity of the message content (including the passenger seat location and cryptographic key).

In some examples, information such as the cryptographic key provided to and stored by the PCU 206 may be updated from time to time through an updated configuration. During the updated configuration, the electrical device 222 may again power and provide information to the PCU. As shown in FIG. 6, this information may be provided by the electrical device in a message 600 including, again, the indication of the location of the passenger seat 202 to which the PCU is assigned, and including a new cryptographic key (e.g., symmetric key). In addition, the message may include a HMAC generated using the prior cryptographic key (in its entirety or truncated to limit message size) over the message, which again, may enable verification of both data integrity and authentication of the message. And similar to before, the electrical device may also calculate an error-detecting code (e.g., CRC) and include it in the message.

During initial or updated configuration, the PCU 206 may accept and store the information from the electrical device 222 after successful verification of the error-detecting code, and for an updated configuration, after successful verification of the HMAC. This may protect the PCU from potential cyberattacks during and after its initial configuration. In instances in which either verification is unsuccessful, the PCU may respond in any of a number of different manners, such as by discarding the message without storing its information. The PCU through its microprocessor 408 may also initialize a message sequence counter that may then be incremented when a push-button 220, 424 is pushed, and the PCU interacts with the control unit 214, 314 to effect control of the PSU 208 in response thereto.

In some examples, the electrical device 222 may also query for and store a unique identifier of a PSU 208 (or identifiers of one or more passenger-service components—e.g., reading light, attendant call light—of the PSU) controllable by the PCU 206. This information may be queried from the PCU, or in some examples, may be queried from the AIDC component 216 of the passenger seat 202 to which the PCU is assigned. Or in some examples, the information may be queried directly from an operator of the electrical device.

Figure 7:
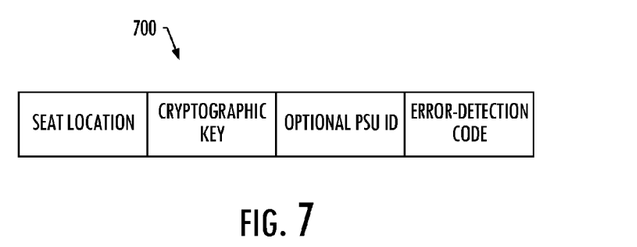

During initial or updated configuration of the PCU 206, the electrical device 222 may also communicate with the control unit 214, 314 to provide the control unit with information to enable the control unit to interact with the PCU. This communication may be carried out wirelessly or by wire, or in some examples by some form of portable storage device. FIG. 7 illustrates a message 700 including information that may be provided from the electrical device to the control unit for a particular PCU. As shown, the message may include the indication of the location of the passenger seat 202 to which the PCU is assigned, and the cryptographic key currently in use by the PCU. The message may also optionally include the identifier (ID) of the PSU 208 (or one or more of its passenger-service components) associated with the passenger seat. And again, the electrical device may also calculate an error-detecting code (e.g., CRC) and include it in the message.

In instances in which a passenger pushes a push-button 220, 424, the PCU 206 may be powered and generate an instruction (a message) to control the PSU 208 in response thereto. This instruction may be wirelessly transmitted to the control unit 214, 314 to effect control of the PSU. In some examples, the PCU may repeatedly transmit the instruction multiple times (constrained by the harvested energy), which may increase the likelihood of successful delivery of the instruction by the control unit.

Figure 8:
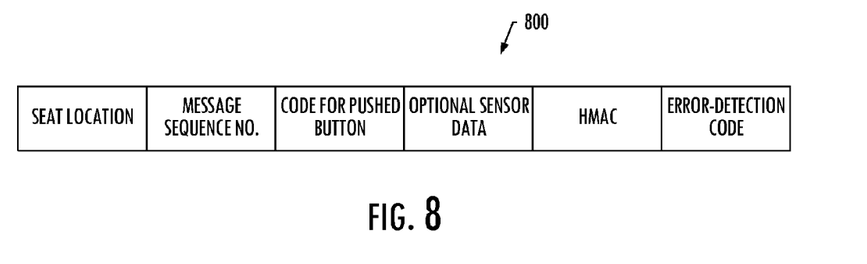

FIG. 8 illustrates an instruction (message) 800 including information that may be provided from the PCU 206 to the control unit 214, 314. As shown, for example, the instruction may include the indication of the location of the passenger seat 202 to which the PCU is assigned, and an indication (e.g., identifying code) of the passenger-service component (e.g., reading light or attendant call light) of the PSU 208 for which the push-button is pressed. The instruction may also include a monotonically-increasing message sequence number, and optionally any environmental-condition sensor measurement data.

The message sequence number may provide liveness of the message transmission and mitigation of potential replay attacks. In some examples, the message sequence number may provide liveness by the control unit 214, 314 being configured to ensure that the modulo value of the message sequence number is greater than the message sequence number from a prior successfully-received message. The control unit may also institute bounds on how much larger, from modulo arithmetic perspective, the message sequence number may be so as to further mitigate replay attack probability and thereby enhance communication security.

In some examples, the instruction 800 may include a HMAC generated using the current cryptographic key (in its entirety or truncated to limit message size) over the message. Additionally or alternatively, the instruction may be encrypted using the cryptographic key. Encryption may not be needed in all instances given less sensitivity of the information in the instruction, but it may nonetheless be desirable to verify data integrity and authentication of the message, which the HMAC may enable. And the PCU 206 may also calculate an error-detecting code (e.g., CRC) and include it in the instruction. The control unit 214, 314 may validate the instruction based on the message sequence number, HMAC and error-detection code; and if successfully validated, effect control of the PSU 208 according to the indication of its passenger-service component for which the push-button is pressed.

As explained above, the PCUs 206 may be identified by the location of their respective assigned passenger seats 202. In some examples, however, the PCUs may instead be identified by respective identifiers unique to the PCUs without regard to their assigned passenger seats. One example of a suitable manner of identifying the PCUs may be by respective unique hardware identifiers such as by respective unique media access control (MAC) addresses. For any given PCU, its identifier may be provided to the control unit 214, 314 in lieu of an indication of the location of its assigned seat, and the control unit may maintain a database including table that maps the PCU identifier to the location of its assigned seat.

During initial configuration of the PCU 206, the electrical device 222 may still generate the indication of the location of assigned passenger seat 202, but instead of providing the indication to the PCU, the PCU may provide an indication of its identifier to the electrical device. The electrical device may then associate the PCU identifier with the location of the assigned passenger seat. This may repeat for others of the PCUs, with the electrical device building a table of PCU identifiers and assigned passenger seats, which the electrical device may upload to the control unit 214, 314. Or in other examples, the electrical device may upload the PCU identifier and associated location of the assigned passenger seat after the initial configuration of each PCU.

In these examples, messages 500 and 600 from the electrical device 222 to the PCU 206 may omit the indication of the location of the assigned passenger seat. Message 700 from the electrical device to the control unit 214, 314 may additionally include the PCU identifier. And message 800 from the PCU to the control unit may include the PCU identifier in lieu of the location of the assigned passenger seat. The control unit may obtain the location of the assigned passenger seat in its database from the PCU identifier; and effect control of the PSU 208, such as in the manner described above.

Figure 9:
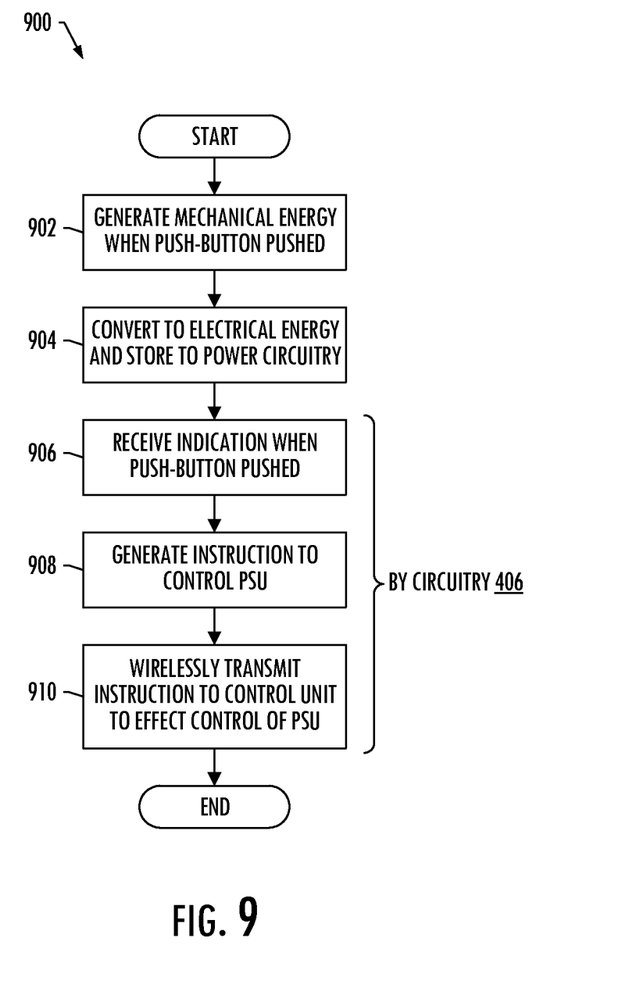
FIG. 9 illustrates various operations in a method of controlling a passenger service unit (PSU) onboard an aircraft (or other passenger vehicle) from a PCU including a push-button switch, and control and communication circuitry, according to various example implementations.

FIG. 9 illustrates various operations in a method 900 of controlling a PSU 208 onboard an aircraft 100 (or other passenger vehicle) from a PCU 206 including a push-button switch 220, and control and communication circuitry 406, according to various example implementations of the present disclosure. As shown at blocks 902 and 904, the method may include generating mechanical energy when the push-button is pushed, and converting the mechanical energy to electrical energy, and storing the electrical energy. The control and communication circuitry may be powered solely from the stored electrical energy. By the control and communication circuitry, then, the method may include receiving an indication when the push-button is pushed, and generating an instruction to control the PSU in response thereto, as shown in blocks 906 and 908. And also by the control and communication circuitry, the method may include wirelessly transmitting the instruction to a control unit 214, 314 configured to effect control of the PSU based thereon, as shown in block 910.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A passenger control unit comprising:
a push-button for control of a passenger service unit onboard a passenger vehicle, the push-button being configured to generate mechanical energy when pushed;
a power assembly coupled to the push-button, and configured to convert the mechanical energy to electrical energy, and store the electrical energy; and
control and communication circuitry coupled to the power assembly and powered solely from the electrical energy stored thereby, the control and communication circuitry including:
a microprocessor coupled to the push-button, and configured to receive an indication when the push-button is pushed, and generate an instruction to control the passenger service unit in response thereto, including the microprocessor being configured to generate a keyed-hash message authentication code (HMAC), and include the HMAC in the instruction; and
a communications interface coupled to the microprocessor and configured to wirelessly transmit the instruction to a control unit configured to effect control of the passenger service unit based thereon.

2. The passenger control unit of claim 1, wherein the power assembly comprises:
an electric generator configured to convert the mechanical energy to electrical energy; and
an accumulator coupled to the generator and configured to store the electrical energy.

3. The passenger control unit of claim 1, wherein the communications interface being configured to wirelessly transmit the instruction includes being configured to wirelessly transmit the instruction to the control unit independent of any in-flight entertainment system onboard the passenger vehicle.

4. The passenger control unit of claim 1, wherein the passenger service unit includes a reading light and an attendant call light,
wherein the passenger control unit further comprises a push-button assembly including the push-button for control of one of the reading light or attendant call light, and another push-button for control of the other of the reading light or attendant call light, and
wherein the microprocessor being configured to generate the instruction includes being configured to generate the instruction including an indication of the reading light or attendant call light for which the push-button is pressed.

5. The passenger control unit of claim 1, wherein the microprocessor being configured to generate the instruction includes being configured to generate the instruction including an indication of a location of a passenger seat assigned to the passenger control unit, or a unique identifier of the passenger control unit from which the location of the passenger seat is obtainable, and
wherein the control unit includes a head-end, and communications interface being configured to wirelessly transmit the instruction includes being configured to wirelessly transmit the instruction to the head-end configured to locate the passenger service unit from a plurality of passenger service units based on the location of the passenger seat.

6. The passenger control unit of claim 1, wherein the communications interface being configured to wirelessly transmit the instruction includes being configured to wirelessly transmit the instruction to the control unit dedicated to the passenger service unit, the control unit being one of a plurality of control units dedicated to a respective plurality of passenger service units.

7. The passenger control unit of claim 1 configured to inductively couple to an electrical device for transfer of electrical energy therefrom, wherein the power assembly being configured to store the electrical energy includes being configured to store the electrical energy transferred from the electrical device.

8. The passenger control unit of claim 7, wherein the communications interface includes a near-field-communication interface configured to inductively couple to the electrical device, and receive an assignment of a passenger seat to the passenger control unit, the assignment being received from the electrical device during an initial configuration of the passenger control unit, and
wherein the microprocessor being configured to generate the instruction includes being configured to generate the instruction including an indication of a location of the passenger seat assigned to the passenger control unit.

9. The passenger control unit of claim 8, wherein the near-field-communication interface is further configured to receive a cryptographic key from the electrical device during the initial configuration of the passenger control unit, and
wherein the microprocessor being configured to generate the HMAC includes being configured to generate the HMAC using the cryptographic key.

10. A method of controlling a passenger service unit onboard a passenger vehicle from a passenger control unit including a push-button switch, and control and communication circuitry, the method comprising:
generating mechanical energy when the push-button is pushed;
converting the mechanical energy to electrical energy, and storing the electrical energy, the control and communication circuitry being powered solely from the stored electrical energy; and by the control and communication circuitry,
receiving an indication when the push-button is pushed, and generating an instruction to control the passenger service unit in response thereto, including generating a keyed-hash message authentication code (HMAC), and including the HMAC in the instruction; and
wirelessly transmitting the instruction to a control unit configured to effect control of the passenger service unit based thereon.

11. The method of claim 10, wherein wirelessly transmitting the instruction includes wirelessly transmitting the instruction to the control unit independent of any in-flight entertainment system onboard the passenger vehicle.

12. The method of claim 10, wherein the passenger service unit includes a reading light and an attendant call light, wherein the passenger control unit further has a push-button assembly including the push-button for control of one of the reading light or attendant call light, and another push-button for control of the other of the reading light or attendant call light, and wherein generating the instruction includes generating the instruction including an indication of the reading light or attendant call light for which the push-button is pressed.

13. The method of claim 10, wherein generating the instruction includes generating the instruction including an indication of a location of a passenger seat assigned to the passenger control unit, or a unique identifier of the passenger control unit from which the location of the passenger seat is obtainable, and wherein the control unit includes a head-end, and wirelessly transmitting the instruction includes wirelessly transmitting the instruction to the head-end configured to locate the passenger service unit from a plurality of passenger service units based on the location of the passenger seat.

14. The method of claim 10, wherein wirelessly transmitting the instruction includes wirelessly transmitting the instruction to the control unit dedicated to the passenger service unit, the control unit being one of a plurality of control units dedicated to a respective plurality of passenger service units.

15. The method of claim 10 further comprising inductively coupling the passenger control unit to an electrical device for transfer of electrical energy therefrom, wherein storing the electrical energy includes storing the electrical energy transferred from the electrical device.

16. The method of claim 15, wherein the passenger control unit further has a near-field-communication interface for inductively coupling the passenger control unit to the electrical device, wherein the method further comprises by the near-field-communication interface, receiving an assignment of a passenger seat to the passenger control unit, the assignment being received from the electrical device during an initial configuration of the passenger control unit, and wherein generating the instruction includes generating the instruction including an indication of a location of the passenger seat assigned to the passenger control unit.

17. The method of claim 16 further comprising by the near-field-communication interface, receiving a cryptographic key from the electrical device during the initial configuration of the passenger control unit, and wherein generating the HMAC includes generating the HMAC using the cryptographic key.

18. A passenger vehicle comprising:

a main body defining a cabin through which a plurality of passenger seats are situated;

a plurality of passenger service units associated with the respective plurality of passenger seats;

a plurality of passenger control units each of which includes a push-button for control of a respective passenger service unit of the plurality of passenger service units, each passenger control unit being configured to at least:

harvest and store electrical energy solely from which the passenger control unit is powered; and receive an indication when the push-button is pushed, and generate and wirelessly transmit an instruction to control the respective passenger service unit in response thereto, including generation of a keyed-hash message authentication code (HMAC), and inclusion of the HMAC in the instruction; and at least one control unit coupled to the plurality of passenger service units, a control unit of the at least one control unit being configured to receive the instruction from the passenger control unit and effect control of the respective passenger service unit based thereon.

* * * * *